(12) United States Patent
Roetteler

(10) Patent No.: US 8,315,969 B2
(45) Date of Patent: Nov. 20, 2012

(54) ESTIMATING A QUANTUM STATE OF A QUANTUM MECHANICAL SYSTEM

(75) Inventor: Martin Roetteler, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 802 days.

(21) Appl. No.: 12/371,941

(22) Filed: Feb. 17, 2009

(65) Prior Publication Data

US 2010/0094796 A1 Apr. 15, 2010

Related U.S. Application Data

(60) Provisional application No. 61/104,290, filed on Oct. 10, 2008.

(51) Int. Cl.
*G06F 9/44* (2006.01)
*G06N 7/02* (2006.01)
(52) U.S. Cl. .............................. 706/52; 706/45; 706/62
(58) Field of Classification Search .................. None
See application file for complete search history.

(56) References Cited

U.S. PATENT DOCUMENTS

| | | | |
|---|---|---|---|
| 5,917,322 A | 6/1999 | Gershenfeld et al. | |
| 6,563,311 B2 | 5/2003 | Zagoskin | |
| 7,180,645 B2 | 2/2007 | Azuma | |
| 7,184,555 B2 | 2/2007 | Whaley et al. | |
| 7,791,780 B2 * | 9/2010 | Munro et al. | 359/107 |
| 2003/0055513 A1 * | 3/2003 | Raussendorf et al. | 700/1 |
| 2004/0000666 A1 | 1/2004 | Lidar et al. | |
| 2005/0062072 A1 | 3/2005 | Yamamoto et al. | |
| 2007/0288684 A1 * | 12/2007 | Bergou et al. | 711/101 |

OTHER PUBLICATIONS

Saunders, S., "Derivation of the Born Rule from Operational Assumptions", Royal Society of London 2004 460, p. 1771-1788, 2004.*
Caves, C., "Quantum Probabilities as Bayesian Probabilities", Physical Review A, vol. 65, p. 1-6, 2002.*
K.S. Gibbons et al., Discrete phase space based on finite fields Physical Review A 70, 062101, Dec. 3, 2004.
U. Leonhardt, Discrete Wigner function and quantum-state tomography Physical Review A vol. 53, No. 5, May 1996.
W.K. Wooters, A Wigner-Function Formulation of Finite-State Quantum Mechanics Annals of Physics 176. 1-21, Dec. 31, 1986.

(Continued)

*Primary Examiner* — Jeffrey A Gaffin
*Assistant Examiner* — Adrian Kennedy
(74) *Attorney, Agent, or Firm* — Joseph Kolodka

(57) ABSTRACT

A method includes performing quantum state tomography from the statistics of a collection of measurements, each of which has only two possible outcomes and has the feature of being a measurement of a single qubit. By carefully choosing the measurements it becomes possible to infer the state of a quantum system from the statistics. Moreover, the function which computes the state from the measurement statistics can be computed efficiently in the dimension of the underlying system. Reconstructing the quantum state is performed in accordance with the following expression:

$$\rho = \left(\frac{2}{d}\sum_{i=1}^{d^2-1} p_i P_i + (1-p_i)(1-P_i)\right) - \left(\frac{d^2-2}{d}\right)I_d,$$

where d is the dimension of the quantum mechanical system, $\rho$ is the state of the quantum mechanical system, $I_d$ denotes the identity operator, $P_i$ is one of the plurality of measurement projectors, and $p_i$ is the probability for the measurement projector $P_i$.

8 Claims, 3 Drawing Sheets

OTHER PUBLICATIONS

E. Knill et al., Quantum Computing and quadratically signed weight enumerators Information Processing Letters 79, Oct. 30, 2000.

A.O. Niskanen et al., Quantum Coherent Tunable Coupling of Superconducting Qubits, Science 316, 723, 2007.

* cited by examiner

ESTIMATING A QUANTUM STATE OF A QUANTUM MECHANICAL SYSTEM

RELATED PATENT APPLICATIONS

This application claims the benefit under 35 U.S.C. §119 (e) of U.S. Provisional Application No. 61/104,290, filed Oct. 10, 2008, the entire contents and file wrapper of which are hereby incorporated by reference for all purposes into this application.

FIELD OF THE INVENTION

The present invention relates to the field of quantum computing and more specifically to methods and apparatus for performing quantum state tomography using degenerate measurements.

BACKGROUND INFORMATION

A basic task in quantum computing is to obtain information about the state of a quantum system by making measurements. If many identically prepared copies of a state are available, one can ask whether it is possible to uniquely determine the state from the statistical data produced by suitably chosen measurements. This problem of estimating an unknown quantum state is also referred to as quantum state tomography.

Quantum state tomography is perhaps one of the most fundamental problems in quantum information processing. At the same time, it provides one of the first potential physics applications for which a quantum computer might be useful. While the problem has been solved, at least conceptually, for the case of non-degenerate measurements of von Neumann type, the problem of quantum state tomography with highly degenerate measurements—a yes/no measurement being the extreme case of a degenerate measurement—has not been addressed thus far. The need for a solution for the case of yes/no measurements arises for instance in quantum computers built on the principles of nuclear magnetic resonance (NMR). In NMR systems it is typically not possible to measure all spins (qubits) of the system. A common assumption in NMR quantum computing is that there is only one pure qubit that can be measured after a quantum computation has been performed.

In principle, as has been described in the physics literature, a solution to the quantum state tomography problem is based on the understanding that knowledge of the statistics of a so-called informationally complete measurement is sufficient to infer the state of the system. There are several constructions for such measurements, with the leading approach being measurements in so-called mutually unbiased bases which correspond to non-commuting observables that optimally capture the features of the system.

The approaches considered so far in the literature, however, have one or more disadvantages. For instance, they are based on non-degenerate measurements, meaning that all of the system's qubits must be measured. While these measurements are convenient from a theoretical point of view, practically it is much more convenient if only one qubit is dedicated for readout, i.e., can be measured. Another limitation is that many informationally complete measurements are of the very general type of a positive operator valued measure (POVM). These, however, do not readily lend themselves to implementation on a quantum computer because one would have to translate the POVM into a quantum circuit first.

While quantum state tomography using yes/no measurements has been studied, so far only systems of dimensions of a power of two have been considered, which greatly restricts the possible systems in which state tomography can be performed.

SUMMARY OF THE INVENTION

A method of estimating a quantum state of a quantum mechanical system includes applying a plurality of operations to the quantum mechanical system, for each of the plurality of operations, taking a single-qubit measurement of the quantum mechanical system, wherein each single-qubit measurement has a binary result, determining a plurality of measurement projectors corresponding to the plurality of single-qubit measurements, determining a probability for each of the plurality of measurement projectors, and reconstructing the quantum state of the system based on the probabilities and the measurement projectors, wherein reconstructing the quantum state is performed in accordance with the following expression:

$$\rho = \left( \frac{2}{d} \sum_{i=1}^{d^2-1} p_i P_i + (1-p_i)(1-P_i) \right) - \left( \frac{d^2-2}{d} \right) I_d,$$

where d is the dimension of the quantum mechanical system, $\rho$ is the state of the quantum mechanical system, $I_d$ denotes the identity operator, $P_i$ is one of the plurality of measurement projectors, and $p_i$ is the probability for the measurement projector $P_i$.

Other aspects, features and advantages of the present invention will be apparent from the detailed description of the invention and from the claims.

DETAILED DESCRIPTION

Figure 1:
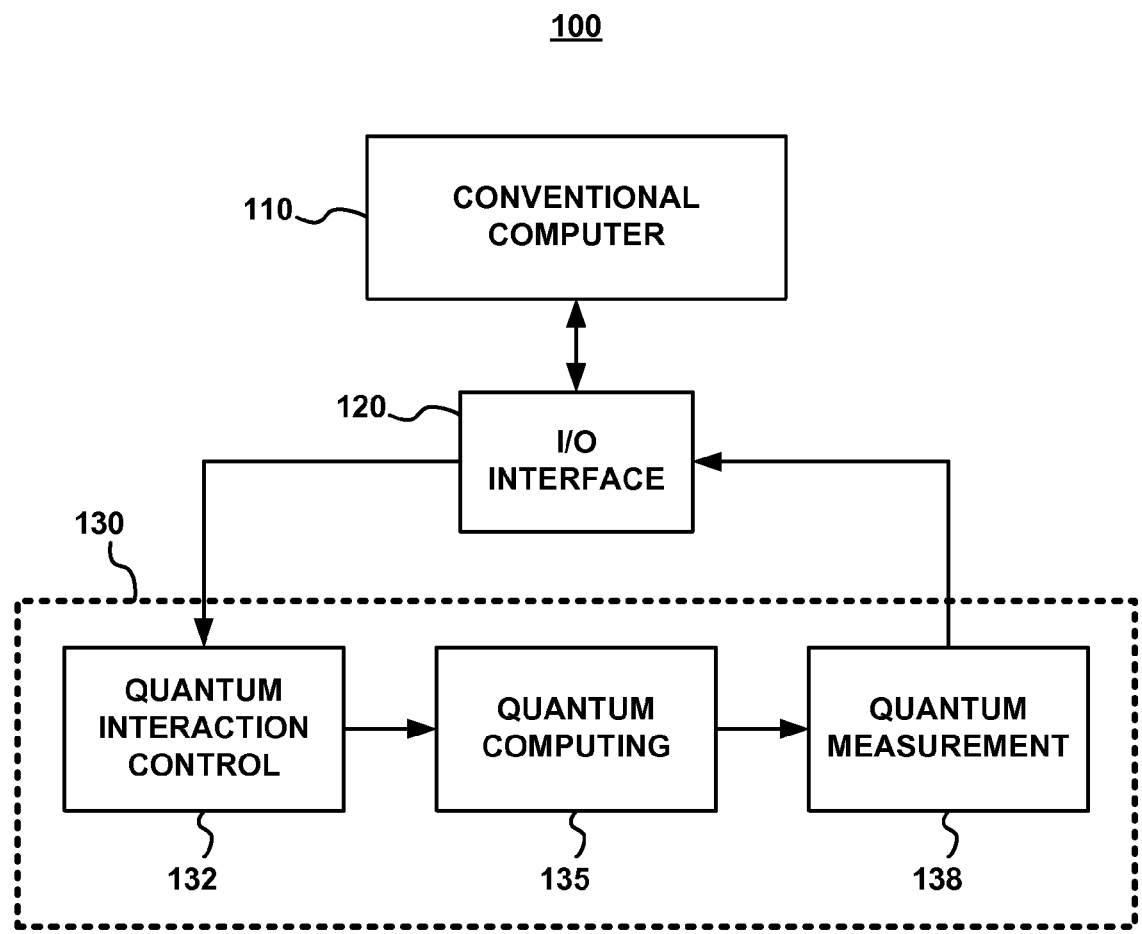
FIG. 1 is a block diagram of an exemplary embodiment of a quantum computer system.

FIG. 1 is a block diagram of an exemplary embodiment of a quantum computer system 100. The system 100 includes a conventional digital computer 110 (e.g., with CPU, memory, bus, etc.) coupled via an I/O interface 120 to a quantum sub-system 130.

The computer 110 formulates a problem to be solved (e.g., factoring, searching) based on, for example, user input and/or interactions with other system(s). The interface 120 transfers information about the problem to be solved from the computer 110 to the quantum sub-system 130 and extracts information about the solution back from the quantum sub-system 130 to the computer 110. The quantum sub-system 130 includes a quantum interaction control apparatus 132 operatively coupled to a quantum computing apparatus 135, which in turn is operatively coupled to a quantum measurement apparatus 138.

The quantum interaction control apparatus 132 interacts with the quantum computing apparatus 135 to set up the problem to be solved by the quantum computing apparatus 135.

The quantum computing apparatus 135 comprises a quantum system that can be configured under the control of the quantum interaction control apparatus 132 to solve a problem. The apparatus 135 may comprise, for example, a Josephson junction, an ion trap, a nuclear magnetic resonance (NMR) system, a Superconducting QUantum Interference Device (SQUID), or any other quantum system or device suitable for the problem or problems to be solved.

The quantum system measurement apparatus 138 measures the quantum computing apparatus 135 to determine its state. The state of the quantum computing apparatus 135 is indicative of the solution to the problem solved. The solution is provided by the measurement apparatus 138 to the I/O interface 120 for communication to the computer 110. The computer 110 can, for example, convey the solution to the user and/or other system(s) with which it may interact.

In one aspect, the present invention provides a novel quantum system measurement apparatus 138.

There are several possible ways in which a measurement can be conducted. One way is illustrated schematically in FIG. 2. Here $\rho$ is the unknown quantum state to be estimated. In the example shown, $\rho$ is the state of a quantum system comprising five qubits. Furthermore, it is assumed that there are many identical copies of $\rho$ available. A complete measurement entails applying a unitary operation U to the state $\rho$ followed by a measurement by the measurement apparatus 138 of each of the five qubits. The application of the unitary operation can be carried out through elementary quantum gate operations which are performed by the quantum computing apparatus 135 under the control of the quantum interaction control apparatus 132. The single-qubit measurements—indicated by the boxes 201-205—are assumed to be in the standard basis, i.e., measurements of the observable $\sigma_z$.

The actual measurement implementation will depend on the physical realization of the quantum computing apparatus 135. For instance, in an exemplary embodiment of a quantum computer based on superconducting qubits, the measurement can be implemented using a superconducting quantum interference device (SQUID) which measures the strength of the magnetic flux induced by current flowing through the circuit. In an NMR-based embodiment, as a further example, the measurement can be carried out by sending suitable radio-frequency (RF) pulses to the system and by measuring the system's response using antennas.

The single-qubit measurements 201-205 produce binary outcomes, indicated by the bit values $b_1, \ldots, b_5$. By taking these measurements many times (for a given U), the statistical data collected from the measurements allows obtaining the probabilities of the occurrence of each bitstring $b_1 b_2 b_3 b_4 b_5$. By choosing N suitable unitary operations $U_1, \ldots, U_N$, it is possible to infer the state $\rho$ from the aforementioned probabilities via a linear transformation. Here N is the square of the dimension d of the underlying quantum system, i.e., for a quantum system comprising n qubits, $d=2^n$ and $N=4^n$. The unitary operations $U_1, \ldots, U_N$ can be Clifford transformations that map the Pauli operator $P=Z \otimes 1 \otimes \ldots \otimes 1$ to all $4^n$ possible Pauli operators, i.e., each $U_i$ maps P precisely to one Pauli operator. In the general case, i.e., if the system dimension d is arbitrary and not restricted to being a power of 2, the conditions on the unitary operations $U_i$ can be explicitly derived and determined as described below in connection with Eq. 1.

Figure 3:
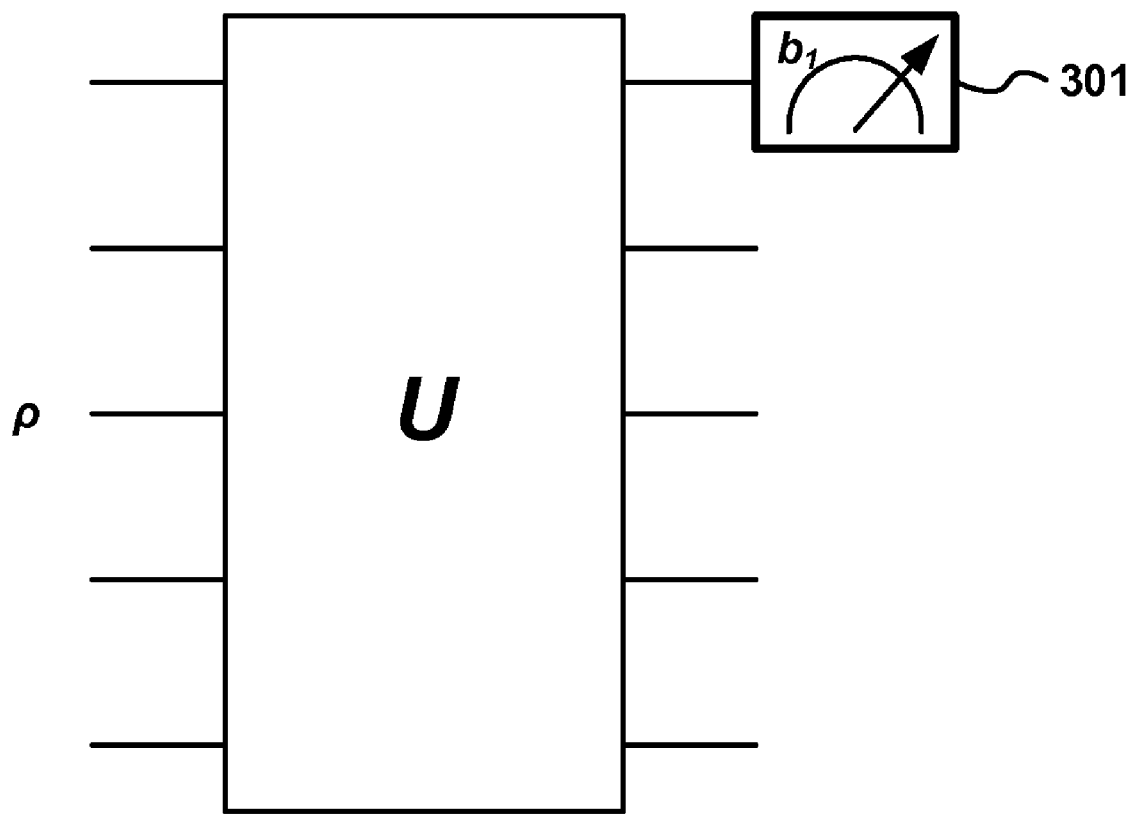
FIG. 3 is a schematic illustration of an arrangement for estimating the state of a quantum system based on the measurement of a single qubit.

In FIG. 3, a more restricted type of measurement arrangement is shown. Again, it is assumed that many identical copies of the state $\rho$ are available and that suitable unitary operations U can be implemented to infer the quantum state $\rho$. As described above, the operations U can be Clifford operations, i.e., they belong to the set of operations that map Pauli operators to themselves. Arbitrary Pauli matrices are thereby transformed using Clifford operations to a specific Pauli matrix which corresponds to the single-qubit measurement in a standard basis. It is known that all Clifford operations can be generated from a small set of basic building blocks, namely, control not operations between any of the qubits, local 2×2 Hadamard operations, and the local phase gate diag(1,i). The actual implementation of these Clifford operations depends on the physical implementation of the quantum computer. Exemplary implementations are described below in greater detail.

Figure 2:
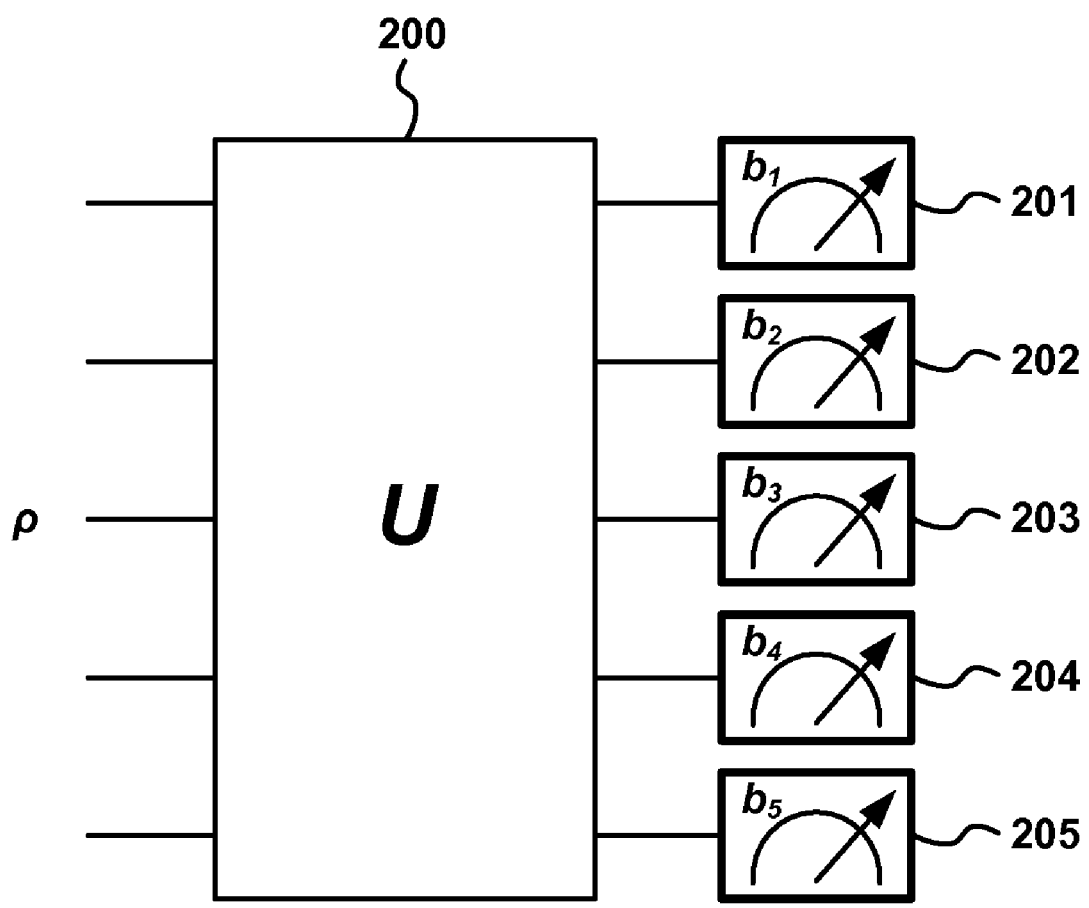
FIG. 2 is a schematic illustration of an arrangement for estimating the state of a quantum system based on the measurement of multiple qubits.

In the case illustrated in FIG. 3, the readout is more restricted than in the case of FIG. 2 because measurements of only one of the qubits are allowed. The other four qubits of the system are not measured. Each measurement now produces only one bit $b_1$ of information about $\rho$ and projects onto two large degenerate subspaces of the overall Hilbert space. In an exemplary embodiment, the present invention provides a construction of a complete set of unitary operations U which will completely characterize the state of a quantum system in d dimensions once the probabilities of the outcomes of these measurements are known. Such probabilities can be gathered from running each measurement multiple times with the same unitary operation applied to the quantum system. The number of times each measurement is to be run will depend on the desired confidence level of the probabilities to be estimated. As can be appreciated, the precision with which the probabilities are estimated is generally better for larger numbers of runs. The precision in turn affects the quality of the resulting quantum state tomography as the state reconstruction is a function of the probabilities.

The dimension d of a finite dimensional Hilbert space can vary greatly with the implementation of the quantum computing apparatus. In NMR-based systems, for example, spin ½ particles are typically used to encode individual qubits so that in such cases, the overall dimension d will be a power of 2. In other systems, such as ions that have been trapped in an electromagnetic trap, the dimension d of one component can be different from 2, depending on the number of addressable and observable energy levels of the ion. In the case of a superconducting quantum computer, the system dimension will typically also be a power of 2, since one component is realized by a superconducting current flowing either clockwise or counter-clockwise. The present invention, which uses yes/no measurements of a single output qubit, can be used with quantum systems of arbitrary dimension or systems whose dimensions are a power of two (i.e., comprise only qubits).

Each of the d unitary operations $U_i$ to be applied to the quantum system, and their corresponding yes/no measurements, can be characterized by a positive operator valued measure (POVM). Each POVM has two complementary elements $(P_i, I_d - P_i)$, where $P_i$ denotes a projector onto a subspace and $I_d$ denotes the identity operator. The unitary operations $U_i$ are chosen in such a way that the following condition is satisfied for all pairs (i, j):

$$tr(P_i P_j) = \frac{1}{d} tr(P_i) tr(P_j). \tag{1}$$

Such operations are also called pair-wise independent because the associated classical random variables $X_i$ and $X_j$ are independent. The corresponding yes/no measurements will also be pair-wise independent.

Let us define $P_i = (I_d + \sigma_i)/2$, where $\sigma_i$ denotes a unitary matrix of order two, i.e., a reflection. $d^2 - 1$ reflections can be defined such that for any corresponding pair, the pair-wise independence property of Eq. 1 above holds. The construction of the reflections is based on Latin squares and (+1/−1 valued) Hadamard matrices, both of size d×d and is described in greater detail in U.S. Provisional Application No. 61/104,290, incorporated herein by reference in its entirety. Let $p_i$ denote the probability of observing the POVM element $P_i$ when measuring the state $\rho$. Hence, the probability of observing the complementary result $I_d - P_i$ is given by $1 - p_i$. According to the Born rule, the relationship $p_i = tr(\rho P_i)$ holds between the probabilities for these events, the quantum state $\rho$, and the POVM elements. An expression for estimating the quantum state $\rho$ of a d-dimensional system from the corresponding probabilities $p_i$ of the POVM elements $P_i$ is as follows:

$$\rho = \left( \frac{2}{d} \sum_{i=1}^{d^2-1} p_i P_i + (1 - p_i)(1 - P_i) \right) - \left( \frac{d^2 - 2}{d} \right) I_d. \quad (2)$$

Quantum state tomography can thus be performed in accordance with Eq. 2. As mentioned above, the probabilities $p_i$ can be obtained by repeating the measurements a large number of times.

A method of estimating a quantum state from the outcomes of yes/no measurements, in accordance with the present invention, allows determining the state of a given quantum mechanical system efficiently. It does so with the minimum number of single-qubit measurements necessary to uniquely characterize the quantum state. Moreover, the method is resilient against measurement imprecisions, such as over- or under-rotations of the single-qubit measurements.

It is expected that the techniques of the present invention will ultimately help to make quantum state tomography for NMR quantum computing (liquid or solid state) more efficient and easier to implement. The present invention is applicable to any physical embodiment of a quantum computer. It is particularly beneficial for systems in which a single distinguished qubit exists for readout. Examples of such systems include arrays of superconducting qubits (charge or flux) based on Josephson junctions in which only one qubit is used for readout. A superconducting qubit system is described in Niskanen et al, Science, vol. 316, pp. 723-726, May 2007. Exemplary embodiments with superconducting qubit and NMR qubit quantum systems will now be described.

In one practicable application, a two-qubit system that can be described in the form of a Hamiltonian is considered as the quantum computing apparatus 135 in the system of FIG. 1. A natural time evolution of the system (H) for a time t is given by a unitary operator $e^{\{-Ht\}}$. The Hamiltonian describing the physical system can be, for example, of the ZZ-type, in the case of a liquid state NMR, or, for the case of superconducting flux qubits, of the following form:

$$H_{rot} = \sum_{j=1}^{2} \frac{\Omega_j}{2} (\cos\varphi_j \sigma_x^j - \sin\varphi_j \sigma_y^j) + \frac{\Omega_{12}}{4} (\sigma_x^1 \sigma_x^2 - \sigma_y^1 \sigma_y^2). \quad (3)$$

Eq. 3 shows the Hamiltonian for the natural coupling between two superconducting flux qubits. In Eq. 3, $\Omega_j$, is the resonant microwave-induced single-qubit Rabi frequency of qubit j. A typical value of $\Omega_j$, for a superconducting flux qubit system, realized as an Al/AlO$_x$ low temperature superconducting circuit with Josephson Junctions, is between 4 and 7 GHz. Furthermore, $\phi_j$ is the microwave phase, a real number between 0 and $2\pi$, and $\sigma_x^j$ and $\sigma_y^j$ are Pauli spin matrices, for the qubit j. Controllable coupling between the qubits is achieved using the term $\Omega_{12}$ in the Hamiltonian which can be used to drive the sum-frequency transition. A typical frequency for the term $\Omega_{12}$ is between 20 and 25 MHz.

An example of a quantum computer built on low-temperature superconducting quantum circuits (e.g., Josephson Junctions) has decoherence time values ($T_2$) on the order of a few nanoseconds and relaxation time values ($T_1$) on the order of a few hundred nanoseconds. Single-qubit gates can be operated at frequencies between 4-6 GHz in a typical implementation, and two-qubit gates can be operated at frequencies between 20 and 25 MHz in the same typical implementation (e.g., as a low-temperature Al/AlO$_x$ superconductor).

In another exemplary implementation, H is the system Hamiltonian of a molecule in a liquid state NMR quantum computer or a molecule in a solid state NMR quantum computer. In a liquid state NMR embodiment, only Hamiltonians H having ZZ interactions are possible. In a solid state NMR embodiment, homonuclear and heteronuclear dipole-dipole interactions can occur. For liquid state NMR systems, decoherence times $T_2$ on the order of 1-2 seconds and relaxation times $T_1$ on the order of 10-100 seconds have been observed. As described above, the decoherence and relaxation times for superconducting flux qubit embodiments are much shorter and the gate frequencies are much higher.

It is understood that the above-described embodiments are illustrative of only a few of the possible applications of the present invention. Numerous and varied other arrangements can be made by those skilled in the art without departing from the spirit and scope of the present invention.

What is claimed is:

1. A method of estimating a quantum state of a quantum mechanical system, the method comprising:

applying a plurality of operations to the quantum mechanical system;

for each of the plurality of operations, taking a single-qubit measurement of the quantum mechanical system, wherein each single-qubit measurement has a binary result;

determining a plurality of measurement projectors corresponding to the plurality of single-qubit measurements;

determining a probability for each of the plurality of measurement projectors; and reconstructing the quantum state of the system based on the probabilities and the measurement projectors;

wherein reconstructing the quantum state is performed in accordance with the following expression:

$$\rho = \left( \frac{2}{d} \sum_{i=1}^{d^2-1} p_i P_i + (1 - p_i)(1 - P_i) \right) - \left( \frac{d^2 - 2}{d} \right) I_d,$$

where d is the dimension of the quantum mechanical system, $\rho$ is the state of the quantum mechanical system, $I_d$ denotes the identity operator, $P_i$ is one of the plurality of measurement projectors, and $p_i$ is the probability for the measurement projector $P_i$.

2. The method of claim 1, wherein determining the plurality of measurement projectors includes constructing the plurality of measurement projectors from unitary matrices of order two such that the single-qubit measurements are pairwise independent.

3. The method of claim 1, wherein determining the probability for each of the plurality of measurement projectors includes taking the corresponding single-qubit measurement multiple times.

4. The method of claim 1, wherein the quantum mechanical system includes a plurality of superconducting qubits.

5. The method of claim 1, wherein the quantum mechanical system includes a plurality of nuclear magnetic resonance (NMR) qubits.

6. The method of claim 1, wherein the quantum mechanical system is of a dimension that is a power of two, the method comprising:

selecting the plurality of operations applied to the quantum mechanical system by using Clifford operations to transform arbitrary Pauli matrices to a specific Pauli matrix corresponding to each of the plurality of single-qubit measurements in the standard basis.

7. The method of claim 1, wherein the quantum mechanical system is of an arbitrary dimension, the method comprising:

selecting the plurality of operations applied to the quantum mechanical system from Latin squares and +1/−1 valued Hadamard matrices.

8. The method of claim 1, wherein each single-qubit measurement is taken in the standard basis by means of a physical apparatus that can address a component of the system, the component having a dimension of two.

* * * * *